United States Patent [19]

Iwahashi

[11] Patent Number: 5,174,520

[45] Date of Patent: Dec. 29, 1992

[54] TAPE CASSETTE REEL HAVING AN UPPER REEL PORTION FORMED BY DICHROMATIC MOLDING METHOD

[75] Inventor: Yuji Iwahashi, Miyagi, Japan

[73] Assignee: Sony Corporation, Tokyo, Japan

[21] Appl. No.: 388,653

[22] Filed: Aug. 2, 1989

[30] Foreign Application Priority Data

Aug. 30, 1988 [JP] Japan .................. 63-215580

[51] Int. Cl.⁵ ............................................ B65H 75/18
[52] U.S. Cl. .................................................. 242/71.8
[58] Field of Search .............. 242/71.8, 71.9, 199, 242/118.8, 197

[56] References Cited

U.S. PATENT DOCUMENTS

| | | | |
|---|---|---|---|
| 3,410,500 | 11/1968 | Elliott | 242/71.8 |
| 3,876,073 | 4/1975 | Herbertko | 242/118.8 X |
| 4,244,535 | 1/1981 | Moodie | 242/71.8 |
| 4,452,404 | 6/1984 | Gelardi et al. | 242/71.8 |
| 4,715,558 | 12/1987 | Fair et al. | 242/71.8 X |
| 4,752,046 | 6/1988 | Wulfing | 242/71.8 |
| 4,773,614 | 9/1988 | Makino et al. | 242/199 |
| 4,807,826 | 2/1989 | Iwahashi | 242/71.8 |

FOREIGN PATENT DOCUMENTS

| | | |
|---|---|---|
| 0152693A1 | 8/1985 | European Pat. Off. . |
| 0221758A3 | 5/1987 | European Pat. Off. . |
| 0236010A3 | 9/1987 | European Pat. Off. . |
| 0276941A2 | 3/1988 | European Pat. Off. . |

*Primary Examiner*—Daniel P. Stodola
*Assistant Examiner*—William G. Battista, Jr.
*Attorney, Agent, or Firm*—Philip M. Shaw, Jr.

[57] ABSTRACT

A tape cassette reel having an upper flange portion and a lower flange portion formed as one body with a reel hub, in which the central portion of the upper flange portion is made of an opaque resin and a peripheral portion thereof is made of a transparent resin by a dichromatic molding process and a stepped portion is formed on a bonding surface between the central portion and the peripheral portion of the upper flange portion so as to increase a bonding strength of the bonding surface.

8 Claims, 4 Drawing Sheets

TAPE CASSETTE REEL HAVING AN UPPER REEL PORTION FORMED BY DICHROMATIC MOLDING METHOD

BACKGROUND OF THE INVENTION

1. Field of the Invention

The present invention relates generally to tape cassette reels and more particularly to a tape cassette reel having an upper reel portion formed by a dichromatic molding method.

2. Description of the Prior Art

FIG. 1 shows an example of a prior-art tape cassette for use with a so-called 8 mm video tape recorder.

Referring to FIG. 1, it will be seen that a cassette body 1 is comprised of an upper cassette half 2a, a lower cassette half 2b and a tape protecting member 3. The upper cassette half 2a and the lower cassette half 2b are coupled to each other to form a box. The tape protecting member 3 is rotatably attached to the box portion. A transparent, rectangular window 4 is formed on the upper surface of the upper cassette half 2a. Supply and take-up or cassette reels 5S and 5T are provided within the cassette body 1 so as to become freely rotatable. A tape 6 is wound around the cassette reels 5S and 5T through the tape protecting member 3, while both ends of the tape 6 are respectively fixed to the cassette reels 5S and 5T.

Cassette reel pushing springs 7, 7 are provided on the upper surface of the cassette body 1. The cassette reel pushing springs 7, 7 are respectively engaged with center pins 9 (FIG. 2) provided at the central, upper end portion of each of the cassette reels 5S and 5T, as will be described later. Further, a braking member (not shown) is also provided within the cassette body 1 so as to mesh with a brake engaging tooth 12 (FIG. 2) formed around the lower reel portion of each of the cassette reels.

According to the above-mentioned cassette body, it is possible to visually confirm the wound condition of the tape 6 around the cassette reels 5S and 5T through the transparent, plastic window 4 formed on the upper cassette half 2a. If the upper reel or flange portion of each of the cassette reels 5S, 5T is completely made of a transparent, resin material, the inside structure of the reel hub is seen from the outside. To solve this problem, the assignee of the present application has previously proposed a tape cassette reel in which a central portion 15 of an upper flange portion of each of the cassette reels 5S, 5T is formed by a desired opaque material and a peripheral portion 14 of the upper flange portion is formed of a transparent material by a dichromatic molding method. This previously-proposed tape cassette reel will be described hereinunder with reference to FIGS. 2 to 4.

FIG. 2 is a perspective view illustrating an overall arrangement of each of the tape cassette reels 5S, 5T, FIG. 3 is a side view of a section of a reel hub portion of each of the tape cassette reels 5S, 5T shown in FIG. 1 and FIG. 4 is a plan view of each of the tape cassette reels 5S, 5T.

Referring to FIGS. 2 to 4, it will be seen that the tape cassette reels 5S, 5T is comprised of a reel hub 10 formed as one body with a lower flange portion 8 and an upper flange portion 13 secured to the upper end face of the reel hub 10. The upper flange portion 13 is comprised of the peripheral portion 14 made of a transparent, synthetic resin and the central portion 15 made of a desired, opaque material. The upper flange portion 13 is provided with protruded portions 16, 16 formed on the lower end face at its central portion 15 which are fixed to upper end faces 17, 17 of the reel hub 10 by means of an ultrasonic welding-process. Further, a circular concave portion 18 is formed on the upper surface of the upper flange portion 13. An aperture 19 is formed through the central portion 15 of the upper flange portion 13, and a center pin 9 is loosely supported between the central, lower surface of the upper flange portion 13 and the central, upper end face of the reel hub 10. The center pin 9 forms a contact portion which comes in contact with the cassette reel pushing springs 7 provided in the cassette housing 1.

As shown in FIG. 3, a hub drive shaft engaging aperture 20 is formed on the lower surface side of the reel hub 10 so that it can be engaged with a hub drive shaft of an 8 mm video tape recorder body (not shown). As shown in FIG. 2, a clamp piece engaging portion 21 is formed around the peripheral surface of the reel hub 10. The clamp piece engaging portion 21 is used to fix the tape end thereto together with a clamp piece (not shown). Reel brake engaging teeth 12 are formed around the outer peripheral surface of the lower flange portion 8. In FIG. 2, reference numerals 22, 22 designate protruded portions which are used as pouring gates.

According to the above-mentioned prior-art tape cassette reel, when the upper flange portion 13 is formed by the dichromatic molding method, if the tape cassette reel is very small, just like a tape cassette reel for a tape cassette of 8 mm video tape recorder, then the thickness of the upper flange portion 13 is decreased and hence the bonding strength of resin on the bonding surface between the transparent peripheral portion 14 and the central portion 15 made of the colored resin is considerably decreased. The bonding surface can not obtain sufficient bonding strength because the peripheral portion 14 and the central portion 15 are molded from different synthetic resins and the molding conditions thereof are not equal.

SUMMARY OF THE INVENTION

It is a general object of the present invention to provide an improved tape cassette reel having an upper flange portion formed by a dichromatic molding process.

More specifically, it is an object of the present invention to provide a tape cassette reel which can increase the bonding strength of the bonding surface between a central portion and a peripheral portion of an upper flange portion of the cassette reel using a dichromatic molding process.

It is another aspect of the present invention to provide a tape cassette reel for a tape cassette suitable for use with an 8 mm video tape recorder.

According to an aspect of the present invention, there is provided a tape cassette reel comprising:

(a) an upper flange portion having a central portion and a peripheral portion with a bonding surface between them; and (b) a lower flange portion formed as one body with a reel hub, wherein a stepped portion is formed on the bonding surface between said central portion and said peripheral portion, thereby increasing the bonding strength of said bonding surface.

DETAILED DESCRIPTION OF A PREFERRED EMBODIMENT

An embodiment of a tape cassette reel according to the present invention will hereinafter be described in detail with reference to FIGS. 5 to 8. In this embodiment, the tape cassette reel of the invention is applied to the tape cassette reel for an 8 mm video tape recorder similarly to the example of the prior art shown in FIG. 2. Throughout FIGS. 5 to 8, like parts corresponding to those of FIGS. 1 to 4 are marked with the same references and therefore need not be described in detail.

Figure 1:
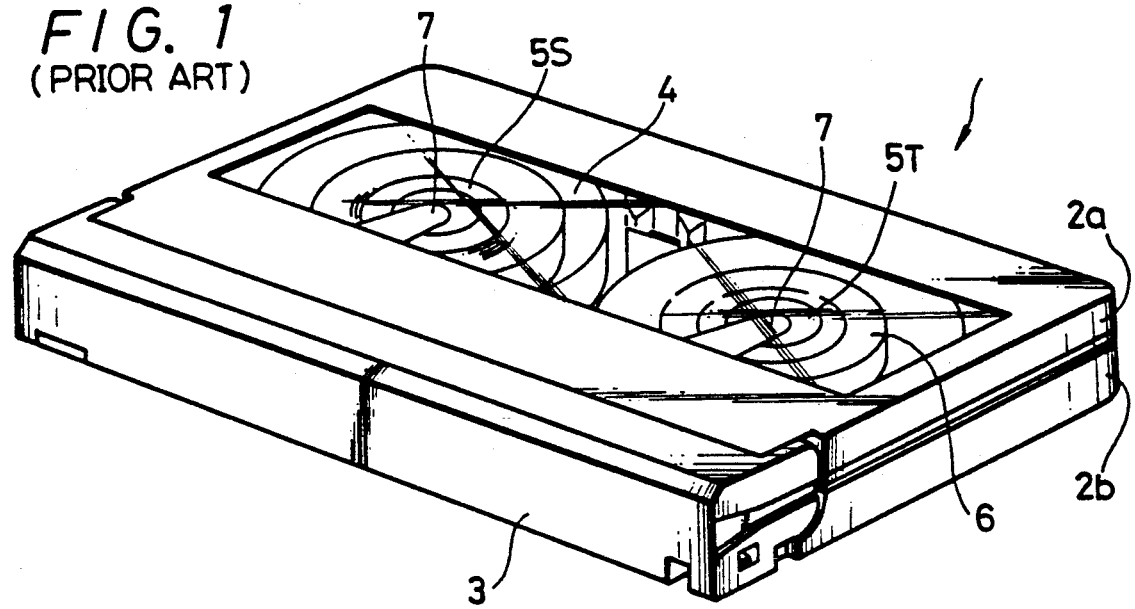
FIG. 1 is a perspective view illustrating an example of a prior-art video cassette.
Figure 2:
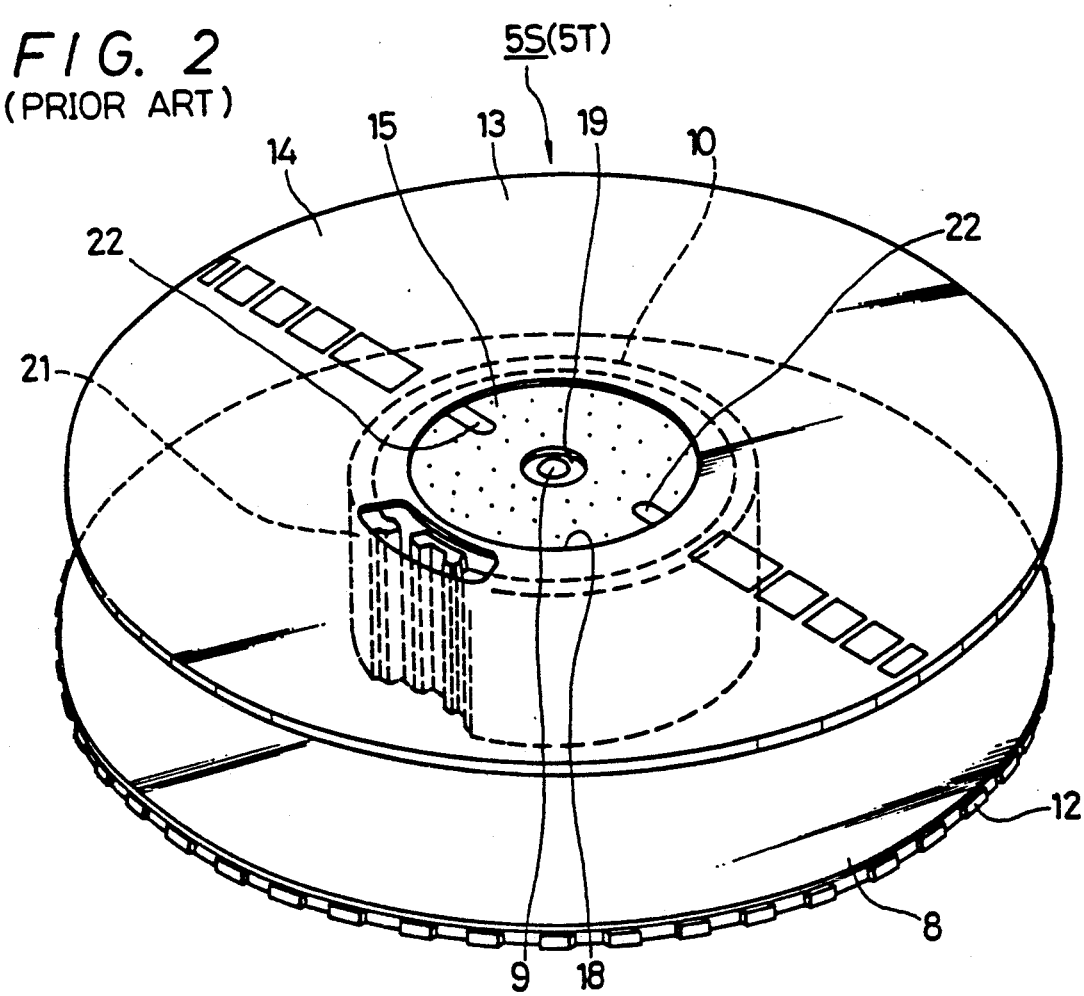
FIG. 2 is an enlarged perspective view illustrating a prior-art tape cassette reel.
Figure 3:
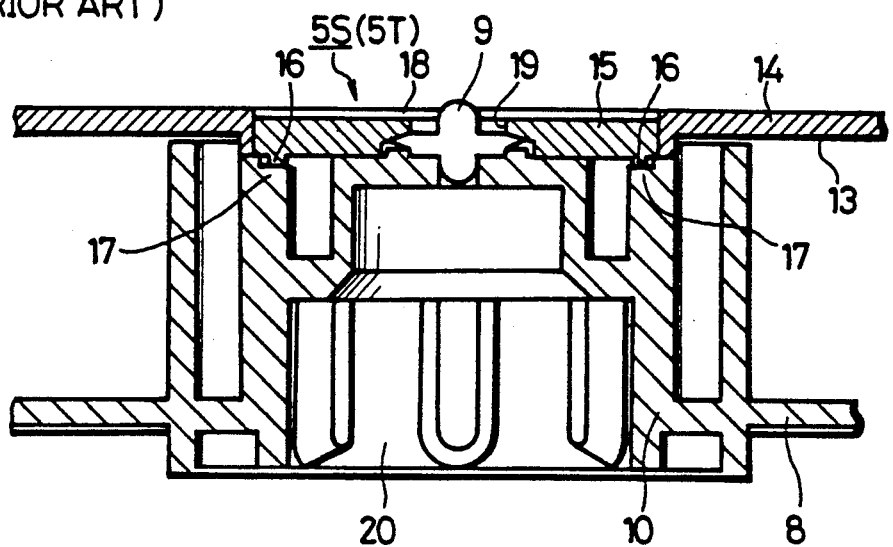
FIG. 3 is a fragmentary, cross-sectional view illustrating a central portion of the tape cassette reel shown in FIG. 2.
Figure 4:
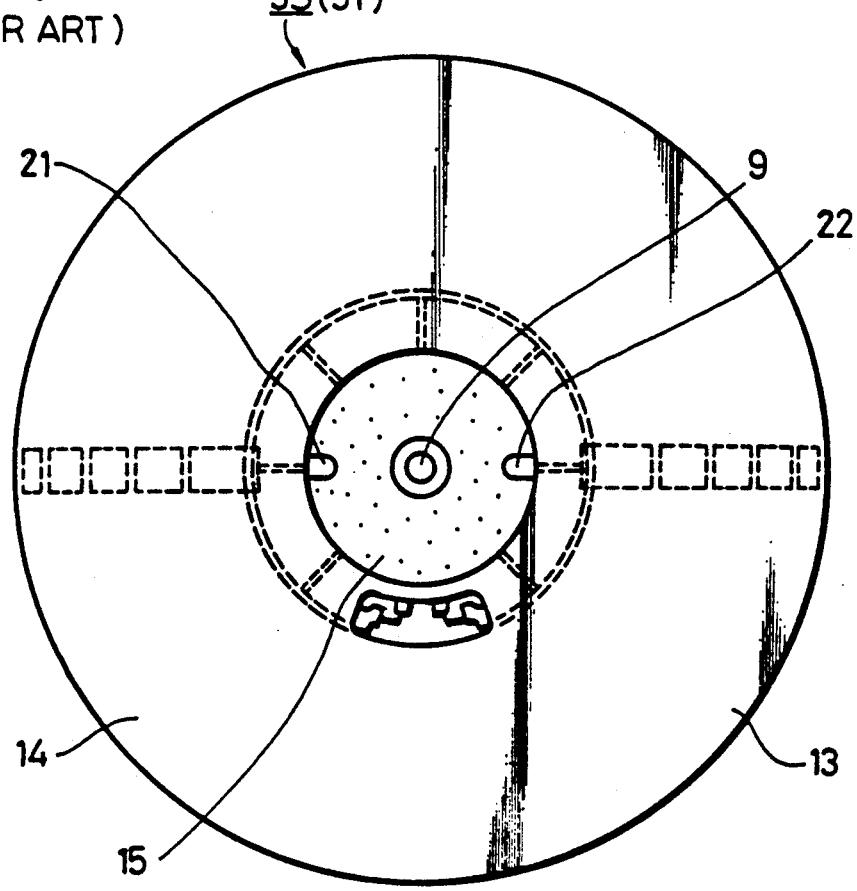
FIG. 4 is a plan view of the prior-art tape cassette reel shown in FIG. 2.
Figure 5:
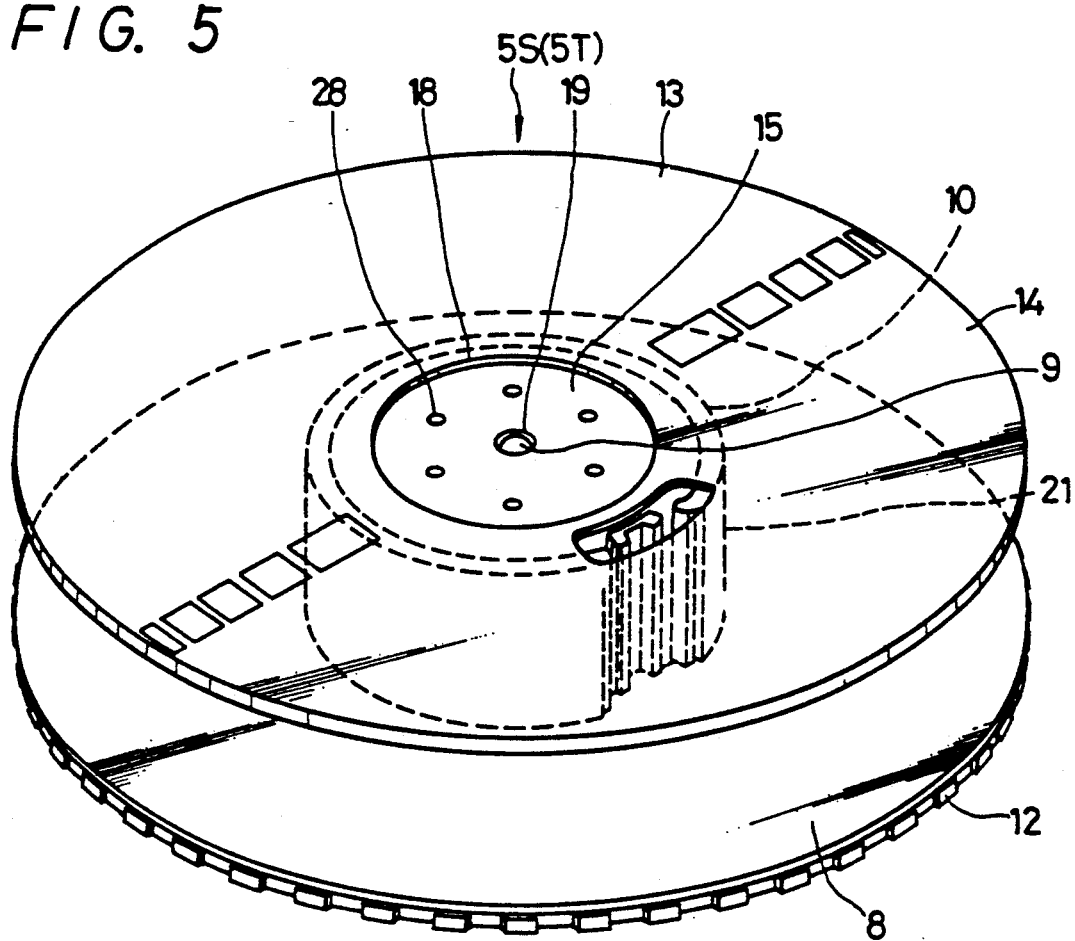
FIG. 5 is a perspective view illustrating an embodiment of a tape cassette reel according to the present invention.
Figure 6:
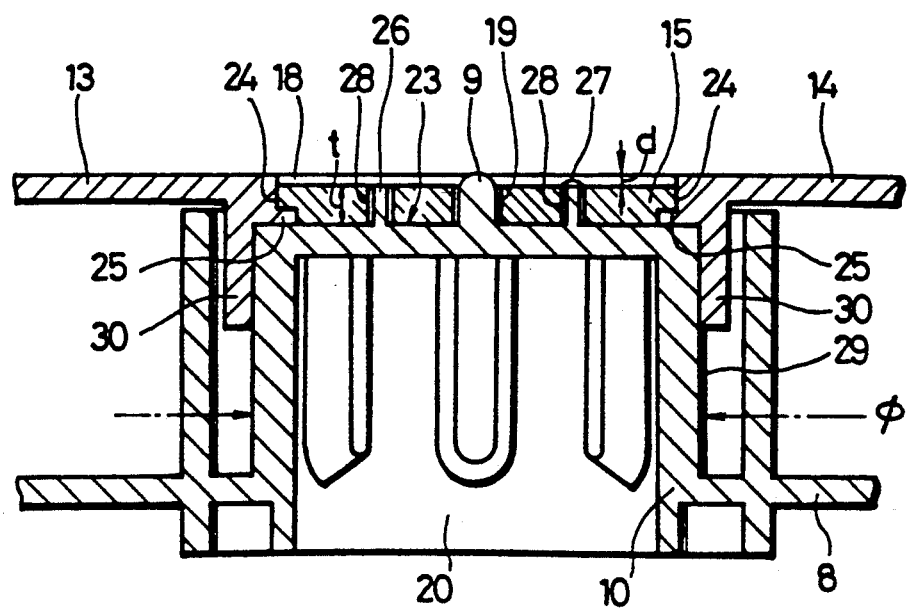
FIG. 6 is a fragmentary, cross-sectional view illustrating a central portion of the tape cassette reel shown in FIG. 5.

In this embodiment, as shown in FIGS. 5 and 6, the reel hub 10 is made of a milk-white synthetic resin and is formed as one body with the lower flange portion 8. The upper flange portion 13 is bonded to an upper surface 23 of a cap-shaped portion 29 of the reel hub 10. This upper flange portion 13 is comprised of the peripheral portion 14 made of a transparent resin and the central portion 15 made of a synthetic resin of a desired color by a dichromatic molding method. A stepped portion 25 is formed on a bonding surface 24 at which the central portion 15 and the peripheral portion 14 are bonded to each other. The stepped portion 25 effectively widens the bonding area of the transparent synthetic resin of the peripheral portion 14 and the colored synthetic resin of the central portion 15 at the bonding surface 24. As shown in FIG. 6, the diameter of the central portion 15 is selected to be slightly smaller than the diameter $\phi$ of a cap-shaped portion 29 of the reel hub 10. The upper surface of the central portion 15 is recessed by a very small amount as shown by a depth d in FIG. 6 from the top surface of the peripheral portion 15, thereby forming a circular concave portion 18.

Figure 8:
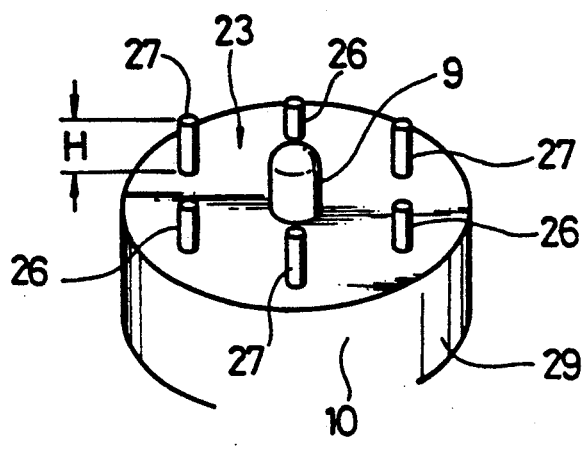
FIG. 8 is a perspective view illustrating a reel hub of the tape cassette reel of the invention.

At the center of the central portion 15 of the upper flange portion 13, there is formed a central aperture 19 through which protrudes the center pin 9 which is integrally formed with the cap-shaped upper surface 23 at its center. Further, a plurality of through-holes 28, 28, ... are formed through the central portion 15 so as to pass therethrough welding pins 27 and guide pins 26 which will be described later. The through-holes 28 are located so as to divide equally by six a predetermined circumference of a circle drawn around the central aperture 19. Into these central apertures 19 and through-holes 28, there are respectively inserted the center pin 9, three guide pins 26 and three welding pins 27 which are all implanted on the upper surface 23 cap-shaped portion 29 of the reel hub 10 as shown in FIG. 8. When the center pin 9, the guide pins 26 and the welding pins 27 are inserted into the center aperture 19 and the through-holes 28 of the upper flange portion 13, the guide pins 26 are guided into the through-holes 28, whereby the upper flange portion 13 becomes parallel to the lower flange portion 8 of the reel hub 10.

As shown in FIG. 8, the length H of each of the welding pins 27 is selected to be larger than the combined value of the thickness t of the central portion 15 of the upper flange portion 13 and the depth d of the circular protruded portion 18. The top end portions of three welding pins 27 protruded from the upper surface of the upper flange portion 13 are welded and secured to the cap-shaped upper surface 23 of the reel hub 10 by an ultrasonic welding-process. In the ultrasonic welding-process, the top end portion of each of the welding pins 27 is located within the depth d of the circular concaved portion 18. The through-hole 28 into which the guide pin 26 is inserted might be a blind through-hole. It is needless to say that the top of the center pin 9 is protruded so as to come in contact with the upper surface of the upper flange portion 13.

With the above-mentioned arrangement, when the welding pins 27 are secured to the reel hub 10 by the ultrasonic welding-process, if the parallelism between the upper flange portion 13 and the lower flange portion 8 is disturbed, the three other guide pins 26, which are not welded, can act to maintain the parallelism of the upper flange portion 13 and the lower flange portion 8.

Figure 7:
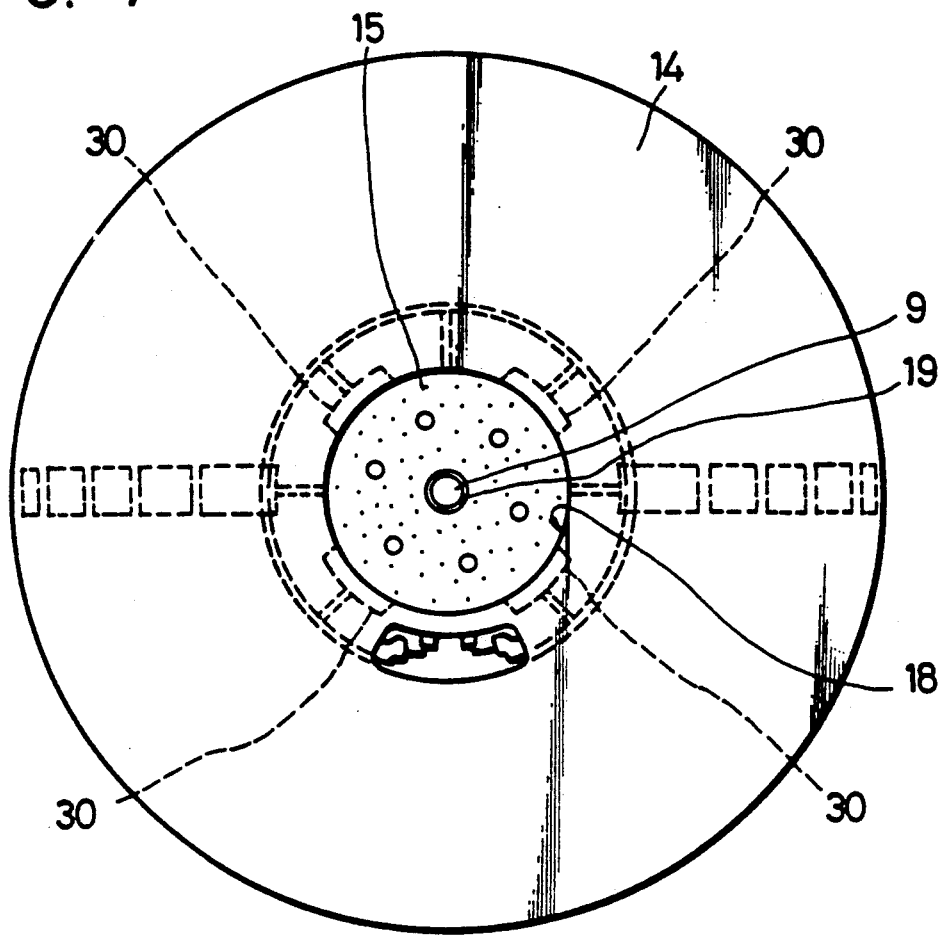
FIG. 7 is a plan view of the tape cassette reel of the invention shown in FIG. 5.

As shown in FIGS. 6 and 7, four members 30, 30, ... are downwardly elongated from the lower surface of the peripheral portion 14 of the upper flange portion 13 along the outer periphery of the cap-shaped portion 29 of the reel hub 10. These elongated portions 30, 30, ... are also useful for accurately positioning the upper flange portion 13 relative to the reel hub 10.

According to the present invention, as set forth above, the central portion 15 and the peripheral portion 14 of the upper flange portion 13 are made by molding the colored resin and the transparent resin by the so-called dichromatic molding method. In this case, the colored resin and the transparent resin are synthetic resins such as acrylonitrile butadiene styrene copolymer (ABS) resin, so-called SAN resin and so on. According to the dichromatic molding process, two kinds (two colors) of resins are molded by one set of mold cores and the molded products are removed from the mold cores under the condition that the respective molded products are welded together, thereby being molded to be unitary.

According to the tape cassette reel of this embodiment, if the tape cassette reel has an upper flange portion of less than 1 mm thick, like the tape cassette reel of a tape cassette for 8 mm video tape recorder, then the bonding strength on the bonding surface can be increased and the upper flange portion is precisely secured to the reel hub in parallel relation with ease. Thus, the tape cassette reel of the present invention can precisely position the upper flange portion on the reel hub with ease.

As set out above, according to the present invention, it is possible to obtain a tape cassette reel in which the bonding strength on the bonding surface can be increased in the dichromatic molding process.

Although a preferred embodiment of the invention has been described in detail herein with reference to the accompanying drawings, it is to be understood that the invention is not limited to that precise embodiment, and that various changes and modifications can be effected therein by one skilled in the art without departing from the scope or spirit of the invention as defined in the appended claims.

I claim:

1. A tape cassette reel comprising:
   (a) an integrally formed lower flange portion and reel hub and wherein the hub has spaced apart, coaxial, cylindrical inner and outer side walls, the outer sidewall providing the support for the tape which is to be wound on the reel; and
   (b) an upper flange portion having a central portion having an outer wall, a peripheral portion for guiding an edge of a tape to be wound on the reel, the peripheral portion being arranged concentrically with respect to the central portion and having an inner wall which confronts the outer wall of the central portion, the juncture of the innerwall and the outer wall thereby forming a bonding surface and wherein the peripheral portion has a portion which projects radially inwardly toward the central portion from the innerwall and the central portion has a portion which projects radially outwardly from the outer wall and over the projecting portion of the peripheral portion to form a stepped portion on the bonding surface between the projecting portion of the central portion and the projecting portion of the peripheral portion, thereby increasing the bonding strength of the bonding surface, and wherein the upper flange peripheral portion has portions which extend downwardly between the inner and outer side walls for abutting the cylindrical inner side wall of the hub.

2. A tape cassette reel comprising:
   (a) an upper flange portion having a central portion, a peripheral portion which is concentric with the central portion and a stepped bonding surface between the central portion and the peripheral portion, thereby increasing the bonding strength of the bonding surface; and
   (b) an integrally formed lower flange portion and reel hub which are attached to the upper flange portion, wherein the hub has spaced apart, coaxial, cylindrical inner and outer side walls, the outer sidewall providing the support for the tape which is to be wound on the reel, and wherein the upper flange peripheral portion has portions which extend downwardly between the inner and outer side walls for abutting the cylindrical inner side wall of the hub.

3. A tape cassette reel according to claim 2, wherein the central portion is made of an opaque resin and the peripheral portion is made of transparent resin by a dichromatic molding process.

4. A tape cassette reel according to claim 2, further comprising a plurality of through-holes formed through the central portion of the upper flange portion.

5. A tape cassette reel according to claim 4, wherein the reel hub has an upper surface and further comprising a plurality of welding pins formed on the upper surface of the reel hub for insertion into the through-holes in the central portion.

6. A tape cassette reel according to claim 5, further including a plurality of guide pins formed on the upper surface of the reel hub for insertion into the through-holes in the central portion.

7. A tape cassette reel according to claim 5, wherein the central portion and the peripheral portion both have upper surfaces and the upper surface of the central portion is recessed below the upper surface of the peripheral portion to thereby form a circular concave space above the central portion.

8. A tape cassette reel according to claim 7, wherein the height of each of the welding pins is selected to be larger than the combined value of the thickness of the central portion and the depth of the circular concave space.

* * * * *